United States Patent [19]

Gatewood, Jr.

[11] Patent Number: 5,673,509
[45] Date of Patent: Oct. 7, 1997

[54] DISPOSABLE RODENT TRAP

[76] Inventor: Askew W. Gatewood, Jr., 3515 Wabash Ave., Baltimore, Md. 21215

[21] Appl. No.: 594,899

[22] Filed: Jan. 31, 1996

[51] Int. Cl.[6] .......................... A01M 1/14; A01M 23/00
[52] U.S. Cl. .......................... 43/58; 43/114; 383/76; 383/106
[58] Field of Search ...................... 43/58, 81, 114, 43/136, 137; 383/76, 106; 206/447

[56] References Cited

U.S. PATENT DOCUMENTS

| 708,234 | 9/1902 | Laird | 383/76 |
|---|---|---|---|
| 1,709,199 | 4/1929 | Thayer | 43/81 |
| 2,056,804 | 10/1936 | Potdevin | 383/106 |
| 2,992,768 | 7/1961 | Gatward | 383/76 |
| 3,177,608 | 4/1965 | Lindelow | 43/61 |
| 3,312,337 | 4/1967 | Martin | 383/106 |
| 3,769,742 | 11/1973 | Spain et al. | 43/81 |
| 4,030,230 | 6/1977 | Souza | 43/81 |
| 4,418,493 | 12/1983 | Jordan | 43/61 |
| 4,488,331 | 12/1984 | Ward | 43/136 |
| 4,608,283 | 8/1986 | White | 383/76 |
| 4,685,244 | 8/1987 | Marks | 43/58 |

FOREIGN PATENT DOCUMENTS 459871  9/1968  Switzerland .......... 383/76

Primary Examiner—Jeanne Elpel
Attorney, Agent, or Firm—Walter G. Finch

[57] ABSTRACT

This invention relates to an adhesive type rodent trap that is disposable and has an opaque housing with a window, preventing unintended view of the trapped rodent but allowing quick intended viewing for checking if the trap is occupied. The trap further includes an entrance and a handle for closing the entrance to the trap and carrying the trap.

6 Claims, 1 Drawing Sheet

5,673,509

DISPOSABLE RODENT TRAP

BACKGROUND OF THE INVENTION

Disposing of a trapped mouse or rodent is an extremely unpleasant task. If caught in a conventional spring loaded trap, the rodent is usually killed upon triggering the trap, however, the force of the spring has a tendency to break the mouse's skin and expose blood and possibly some internal organs. If, on the other hand, the mouse is caught in the newer sticky type trap, it is usually still alive and violently twisting while struggling to free itself, to the point where limbs become broken, deformed and possibly separated. Thus, disposing of a rodent caught in a spring loaded trap is dirty, smelly if not recently discovered, and potentially hazardous, while disposal of a rodent caught in the sticky-type trap can be quite inhumane as the person disposing of the deformed, whimpering mouse must observe its agony as he or she grasps the edge of the trap.

What is needed to cure the deficiencies inherent in the sticky type trap is a disposable, substantially oblique housing for the trap. The trap additionally should have a small window to check for occupancy and a handle providing a closure means as well as a carrying means for the housing. A trap such as this would thereby prevent direct vision of the trapped mouse or rodent. The new trap should also be constructed inexpensively so that the disposability of the trap is economically feasible. The present invention fulfils these and other considerations not addressed in the prior art.

SUMMARY OF THE INVENTION

The present invention relates to a mouse trap. More particularly, this invention relates to a mouse trap that is disposable and has a opaque housing with a translucent window, preventing unintended view of the trapped rodent but allowing quick intended viewing for checking if the trap is occupied.

This invention is a substantial improvement to existing sticky type mouse and rodent traps. Instead of having an exposed tray of trapping adhesive, as commonly used today, this invention encloses the area of adhesive within an opaque housing, thereby preventing feet, small children, or even the ear of a napping dog from becoming accidentally attached. The housing, while preventing inadvertent attachment, additionally provides a shield precluding a person from directly looking at or incidentally touching the trapped rodent while disposing of the trap. While the housing of the trap is opaque to prevent unintended viewing of the trapped animal, a small section is translucent, allowing the trap to be periodically checked so a trapped rodent can be disposed of quickly.

To further assist in disposing of the trap, the housing is only open on a single side, with its open side containing a drawstring type handle. Thus, the disposer can merely pull the handle and the open side of the housing will close, encasing the trapped rodent within the housing of the trap.

It is therefore an object of this invention to provide a trap which is inexpensive and disposable.

It is a further object of this invention to provide a trap which is concealed within a substantially opaque housing to prevent unintended viewing of a trapped rodent.

It is still another object of this invention to provide a trap which has a small viewing portion to visually check if the trap has caught a rodent and is in need of disposal.

It is still a further object of this invention to provide a trap which has only one opening such that a drawstring type handle can close the trap with a single pull.

It is yet another object of this invention to protect unintended animals and people from become accidentally adhesed to the trap.

DETAILED DESCRIPTION OF THE DRAWINGS

Figure 1:
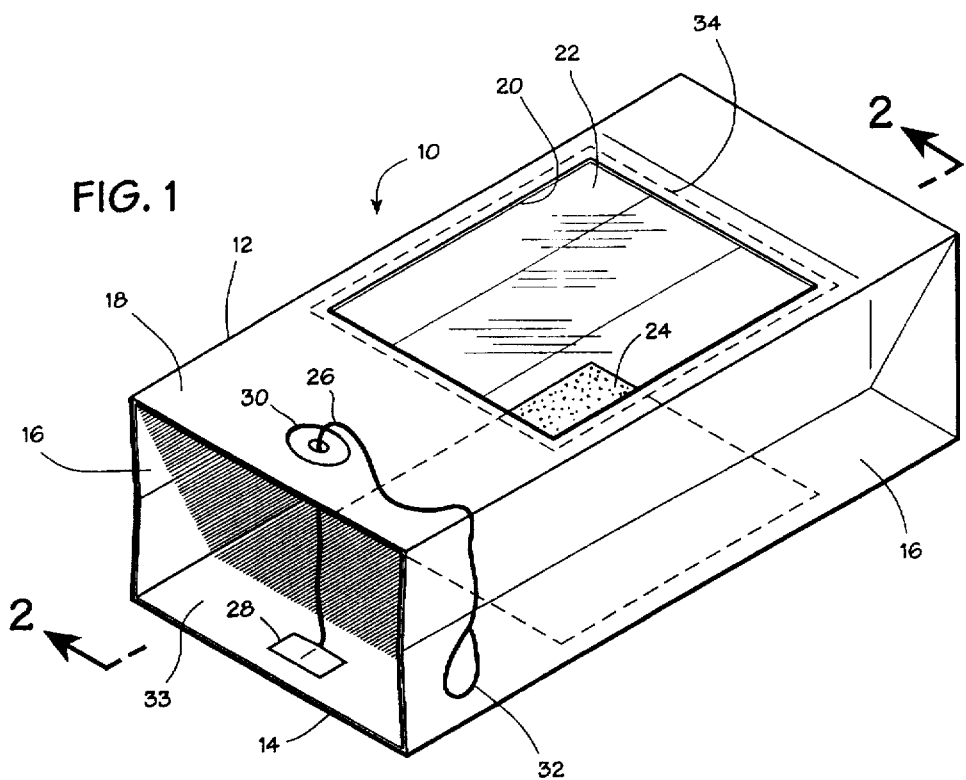
FIG. 1 is a isometric view of the rodent trap illustrating the novel features of the invention.
Figure 2:
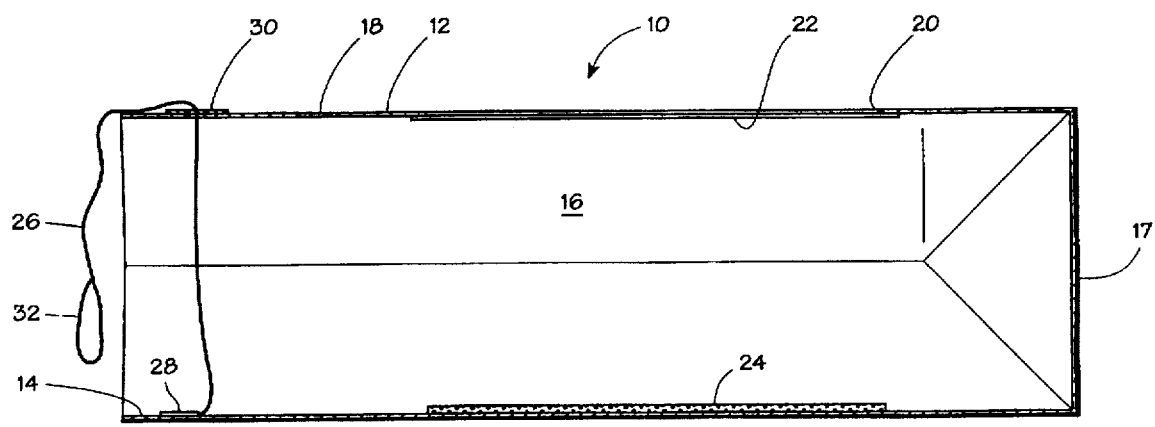
FIG. 2 is a right side cross section of the rodent trap shown in FIG. 1.

Referring to FIGS. 1 and 2, the general trap 10 is illustrated in isometric perspective and right side cross section, respectively. The trap housing 12 is shown comprising two opposed vertical side faces 16, a top face 18, a bottom face 14 opposing the top face 18, and an enclosing end face 17. These faces in tandem creating an entrance opening 33 opposite the enclosing end face 17. The housing may be constructed out of any lightweight flexible material, such as TYVAK™, and preferably is shaped substantially similar to a typical brown paper lunch bag. The faces of the housing 12 are assembled either by precision folding secured with adhesive, as a paper bag is constructed, or are sewn at the seams. The material must, however, be rigid enough to stand open on its own when assembled and resting on its bottom face 14.

While the exterior of the bottom face 14 rests against the floor, the interior face contains the trapping adhesive 24. The adhesive 24 can be any type that is sufficiently tacky enough to restrain and confine the specific rodent intended to be trapped. The adhesive 24 is preferably placed either in the center or close to the rear of the bottom face 10, assuring that a trapped rodent is not visibly extending outwardly through the entrance opening 33. The area of adhesive 24 can be an existing trap slid into the housing or preferably, is incorporated directly within the bottom face 14 of the trap 10.

The top face 18 includes a translucent viewing window 22, preferably located in an opening 20 directly above the adhesive trapping area 24 and being similar in shape and area. The window is attached to the opening 20 of the top face 18 by a strip of adhesive or a line of stitching 34.

This window 22 allows for visual checking of the adhesive area 24 to see if a rodent is attached. Thus, viewing of a trapped rodent is quick with the limited purpose and duration of checking the trap 10 for occupancy. If the trap 10 is occupied, it can then be disposed of without further viewing of the trapped rodent.

The window 22 also has a function when the trap is not being used. It acts as a cover for the adhesive area 24 when the trap is folded flat, either by fully covering it or by covering a raised portion about its periphery, limiting the amount of window 22—adhesive area 24 contact to that which is completely necessary.

Disposal of the trap 10 is quite simple due to the inclusion of a draw string type closing and carrying handle 26. This handle 26 is located near the entrance opening 33, attached to the bottom face 14 and passing through the top face 18 via a reinforced aperture 30. The handle 26 is constructed from an inexpensive elongated strand, preferably string. It is attached to the interior of the bottom face by an attaching means 28, either tape or cross stitching. The string handle 26 extends upward, through the reinforced orifice 30, and terminates into a small loop 32, facilitating both pulling and carrying. Therefore, when the loop 32 of the handle 26 is pulled, the bottom face 14 and the top face 18 converge upon each other, substantially sealing the entrance opening 33, thereby closing the trap housing 12, encasing the rodent within. The handle 26 is then used to carry the trap to a proper disposal place, and a new trap is set to capture additional rodents.

While the preceding description is the preferred and best embodiment of the invention, slight variations can be incorporated without deviating outside the spirit or scope of the claims or contemplation of the inventor.

I claim:

1. A disposable rodent trapping device, comprising:

a substantially lightweight and flexible housing having a bottom face, a top face, an entrance opening in said housing for said rodent, and an aperture in said top face located near said entrance opening;

a trapping means situated on said bottom face;

a handle attached to said bottom face and passing through said aperture, wherein operation of said handle closes said entrance opening, a viewing opening in said top face, and a translucent window adhesively attached to the periphery of said viewing opening in said top face.

2. A disposable rodent trapping device as recited in claim 1, further comprising:

an end face, connected to said top face and said bottom face in opposite relation to said entrance opening.

3. A disposable rodent trapping device as recited in claim 2, wherein:

said handle is a string fixedly attached at one end to said bottom face and terminating into a loop at its opposite end.

4. A disposable rodent trapping device as recited in claim 3, wherein;

said aperture in said top face is reinforced.

5. A disposable rodent trapping device as recited in claim 4, wherein:

said housing is opaque except for said translucent window in said top face.

6. A disposable rodent trapping device as recited in claim 5, said housing further comprising:

at least two oppositely situated side faces, attached to said top face, bottom face, and said end face in such a fashion that said entrance opening is formed integrally therefrom.

* * * * *